United States Patent [19]

Löll

[11] Patent Number: 5,096,042

[45] Date of Patent: Mar. 17, 1992

[54] SORTING STAR FOR CONTAINER HANDLING MACHINERY SPECIFICATION

[75] Inventor: Josef Löll, Regensburg, Fed. Rep. of Germany

[73] Assignee: Krones AG Hermann Kronseder Machinenfabrik, Fed. Rep. of Germany

[21] Appl. No.: 466,335

[22] PCT Filed: Oct. 27, 1989

[86] PCT No.: PCT/EP89/01281

§ 371 Date: May 11, 1990

§ 102(e) Date: May 11, 1990

[87] PCT Pub. No.: WO90/05102

PCT Pub. Date: May 17, 1990

[30] Foreign Application Priority Data

Nov. 9, 1988 [DE] Fed. Rep. of Germany ....... 3838007

[51] Int. Cl.⁵ .................................. B65G 47/84
[52] U.S. Cl. ........................ 198/441; 198/445; 198/476.1; 198/478.1
[58] Field of Search ............ 198/437, 441, 445, 483.1, 198/478.1, 479.1, 476.1, 477.1; 209/522, 523, 524, 526, 617, 654

[56] References Cited

U.S. PATENT DOCUMENTS

| | | | |
|---|---|---|---|
| 3,409,128 | 11/1968 | Hutaff | 209/522 |
| 3,441,120 | 4/1969 | McGill | 198/441 |
| 3,572,493 | 3/1971 | Babunovic | 198/441 X |
| 3,687,285 | 8/1972 | Messervey | 198/441 X |
| 3,975,260 | 8/1976 | Peyton et al. | 198/441 X |
| 4,050,570 | 9/1977 | Kramer | 198/441 X |
| 4,467,908 | 8/1984 | Schneider | 198/441 |
| 4,596,107 | 6/1986 | Pfleger, Sr. | 198/370 X |

FOREIGN PATENT DOCUMENTS

| | | | |
|---|---|---|---|
| 2340796 | 5/1974 | Fed. Rep. of Germany . | |
| 2806058 | 8/1979 | Fed. Rep. of Germany . | |
| 2820315 | 11/1979 | Fed. Rep. of Germany . | |
| 3624411 | 1/1988 | Fed. Rep. of Germany | 198/441 |
| 1402494 | 6/1988 | U.S.S.R. | 198/441 |

Primary Examiner—D. Glenn Dayoan
Attorney, Agent, or Firm—Fuller, Ryan & Hohenfeldt

[57] ABSTRACT

A rotatably driven star plate having turn-bolt mechanisms arranged on its outer periphery adjacent each container pocket. Each mechanism has a housing that is fastened to the star plate, the housing being provided with a bearing bore directed to the periphery of the star plate, a shaft that can rotate 90° in the bearing bore between two limits, a turn-bolt that is rigidly fixed to the outer shaft end that projects from the housing and the outer periphery of the star plate, and a switching arrangement that contacts the shaft and can be forcibly actuated by means of an actuation device.

18 Claims, 6 Drawing Sheets

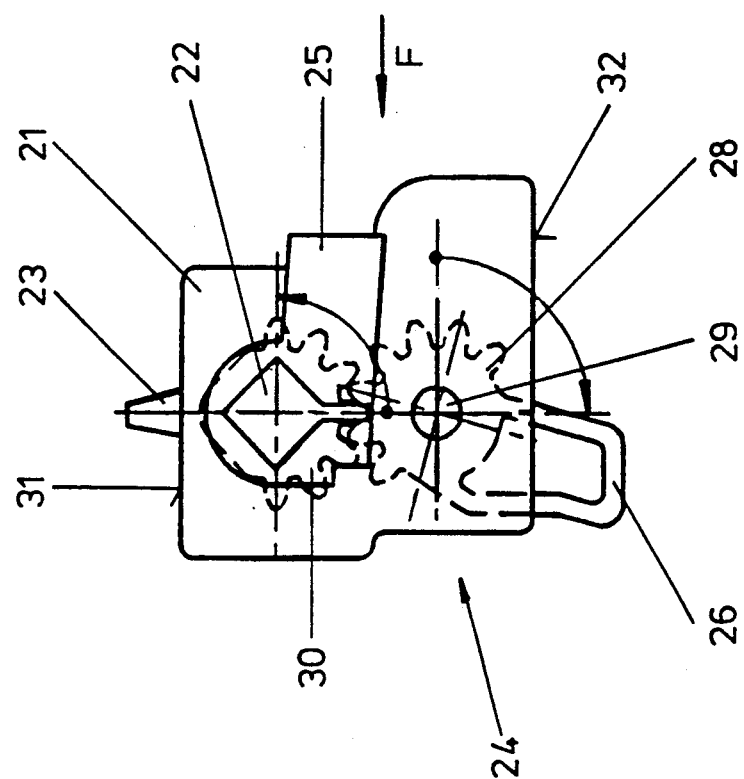
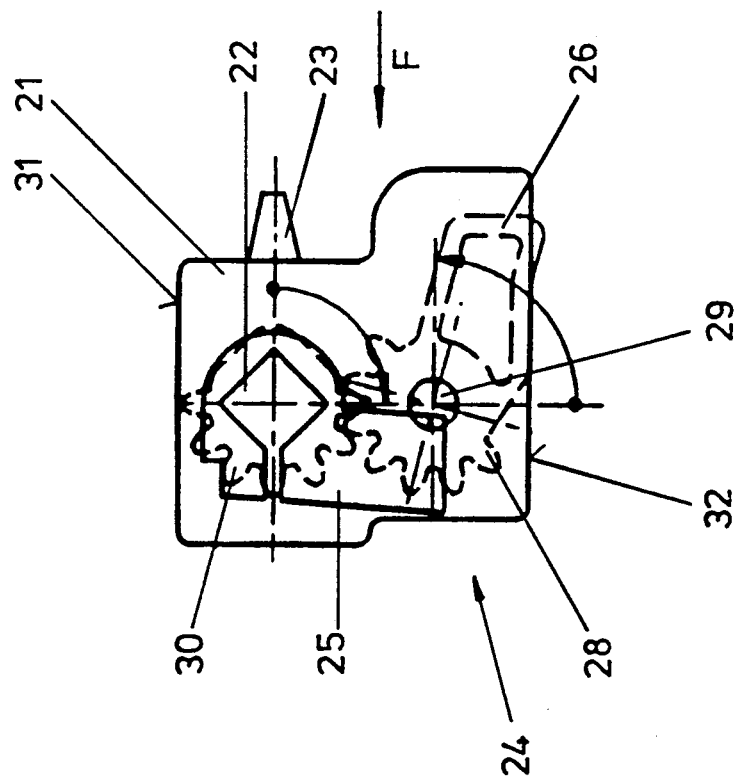

SORTING STAR FOR CONTAINER HANDLING MACHINERY SPECIFICATION

BACKGROUND OF THE INVENTION

The invention relates to a sorting star for container handling machinery with a star plate that can be driven in rotation, said star plate having turn-bolt mechanisms arranged on its outer periphery, each of which has a housing that is fastened to the star plate, said housing being provided with a bearing bore directed to the periphery of the star plate, a shaft that can rotate 90° in the bearing bore between two end limits, a turn-bolt that is rigidly fixed to the outer shaft end that projects from the housing and the outer periphery of the star plate, and a switching arrangement that contacts the shaft and can be forcibly actuated by means of an actuation device to accomplish selective retaining or release of containers from pockets in the star plate.

Such turn-bolt mechanisms are known in practice, and are arranged between the recesses or pockets formed to receive containers and can be placed into a non-operational and operational setting by means of swiveling the shaft, and thereby the turn-bolt, from one end position to the other. In the first setting the turn-bolt extends essentially perpendicular to the plane of the star plate, while in the second setting it is essentially parallel to the plane of the star plate, closing off an associated pocket in such a way that the container located inside it is maintained there and thus transported with the rotating sorting star. If the turn-bolt is in the non-operational setting, then the associated container can exit the pocket, for example with the aid of a conveyor belt running tangential to the sorting star.

The switching arrangement for the turn-bolt mechanism that is known from practice is in the form of a one piece switching lever which is fastened on the inner shaft end, with two switching arms that are perpendicularly arranged. The turn-bolt mechanism is fastened to the star plate in such a way that in one end setting a switching arm projects downward and in the other end setting the other respective switching arm projects upward from the housing essentially perpendicular to the plane of the star plate. The actuation device for actuating the switching lever includes two cams, one above and below the star plate, which engage with the switching arms that project from the housing and which are become actuated by the path of movement that passes with the rotation of the sorting star. In this way, during the rotation of the sorting star, the switching arm that projects, for example, upward from the housing in one end setting and contacting the upper cam, is swiveled, thereby swiveling the turn-bolt and the other respective switching arm into the oppositely directed end setting, in which the switching arm that previously projected upward is essentially arranged parallel to the plane of the star plate, and the other switching arm, previously arranged essentially parallel to the plane of the star plate, projects downward from the housing in order to be acted on by the lower cam during the switch-over of the turn-bolt, and swiveled back again into its previous setting.

In accordance with the arrangement of both switching arms, the one cam underneath the sorting star and the other above it is held in a fixed position by means of a mounting support. At least one of the two cams is intended to be selectively actuated by means of a control installation, while the second can be rigidly maintained in the same position. The mounting support for the lower cam is rigidly connected to the housing of the drive shaft for the sorting star. The upper cam, on the other hand, is fastened to a special control plate which is rotatably supported by means of ball bearings on a driver hub fastened to the free end of the drive shaft for the uptake of the star plate. The control plate is secured against rotation by a stop arm connected to the machine bed. During a change-over from one container size to another, in order to exchange the sorting star the connection between the stop arm fastened to the bed and the control plate must first be loosened. After that, a handwheel with a screw spindle must be loosened in order to be able to take the sorting star along with the relatively heavy control plate away from the driver hub. Overall, the turn-bolt mechanism known from practice is comparatively elaborate in construction and therefore high in cost, and it can be handled only with difficulty.

SUMMARY OF THE INVENTION

The task of the invention is to improve a sorting star of the type mentioned in the introduction so that it is easier to handle.

According to the invention, this task is accomplished by having the switching arrangement actuated from only one side of the star plate. In accordance with this, the actuation device for the switching arrangement is arranged on only one side of the sorting star. In this way the need to attach the cam and the associated mounting support on the side opposite the actuation device is eliminated. Access to the sorting star from this side, previously hindered by the cam and its mount, is now free, so that adjustment work and minor repairs can be carried out in a considerably more simplified and rapid manner on the sorting star mounted on its drive shaft.

Preferably, the switching device can be actuated from the motive side of the sorting star. In this way the heavy control plate that previously carried the upper cam is eliminated, and thereby also its stop arm and ball bearings on the driver hub constructed especially for it. This not only represents a simplification in construction, but also implies considerably simplified handling of the sorting star and thus considerably shorter change-over times when converting from one container size to another. The invention additionally now also makes the use of the rapid closing device known from DE-GM 87 15 020 for a transport star (without a turn-bolt) possible for sorting stars (with turn-bolt), whereby the setup time can be shortened considerably due to the elimination of the previously unavoidable, inconvenient screw spindle.

Advantageously, the switching device includes two switching arms that can be actuated alternately and can be swiveled by 90°, said switching arms engaging with each other with a 90° displacement by means of a gear arrangement that reverses the direction of rotation. Thereby, both switching arms in their respective end settings, in which they provide actuation by means of the actuation device, project in the same direction, for example downward, so that the actuation device is only required underneath the sorting star. The first of the two switching arms is thereby rigidly fixed to the shaft, and the second switching arm is supported parallel to the shaft in the housing. In this regard, it is possible for the first switching arm to be fastened outside of the housing on the inner shaft end, and the second switching arm can be arranged so as to project downward from the housing.

Advantageously, the gear arrangement consists of gears that mesh with each other. Construction turns out to be particularly simple if the gear arrangement is comprised of two gears, one of which is connected to the shaft and the other to the second switching arm. Thereby, the teeth of one gear can be formed on the circumference of the shaft and the teeth of the other gear can be formed on the associated end of the second switching arm. Preferably, each gear is a gear segment.

According to a further development of the invention, the switching arrangement includes a sleeve that is rigidly fixed by the housing and movable on the shaft, said sleeve having inner threads with a large pitch and outer threads on the shaft that engage with them. Thereby, the sleeve can slide by means of a lug that projects from the housing and can be actuated by an actuation device.

According to another advantageous further development of the invention, the switching arrangement includes a first bevel gear that is rigidly fixed on the inner shaft end, and a second bevel gear that meshes with it and is vertically supported. The second bevel gear can thereby be swiveled by means of the actuation arrangement, through a lug that projects downward, whereby the shaft, along with its turn-bolt, is rotated.

DESCRIPTION OF THE PREFERRED EMBODIMENT

Figure 1:
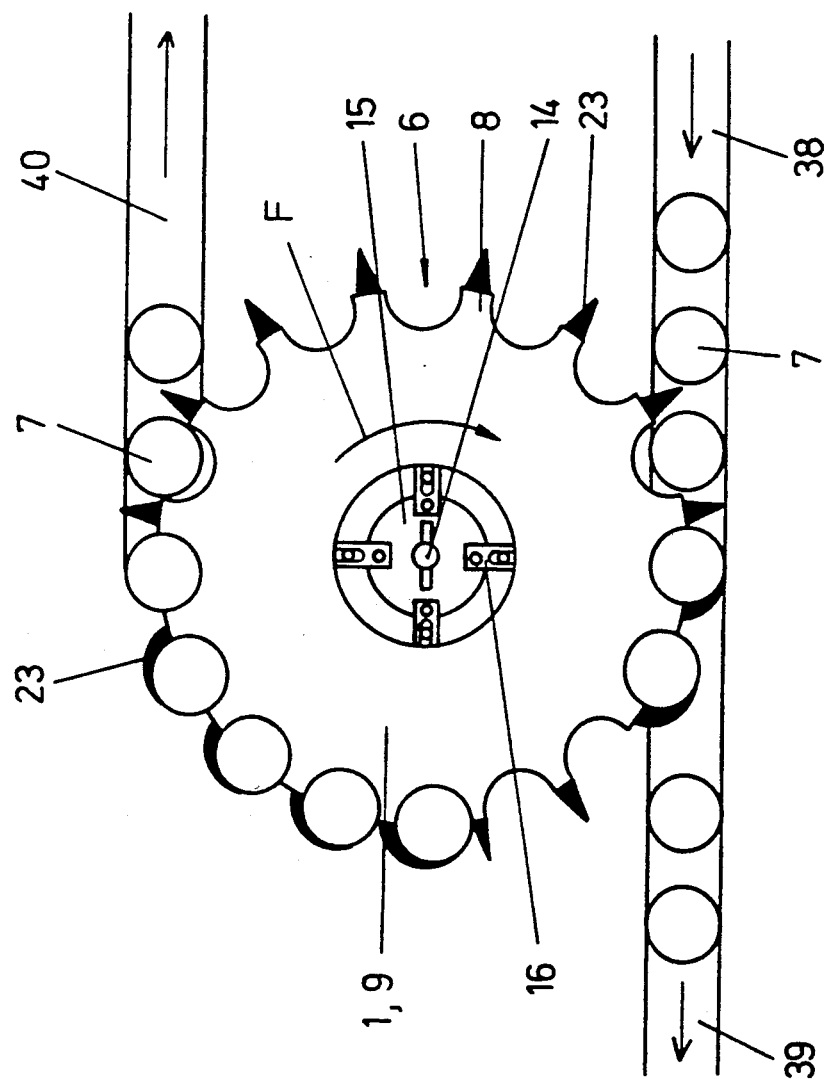
FIG. 1 is a schematic top view of the sorting star according to the invention, during operation.
Figure 2:
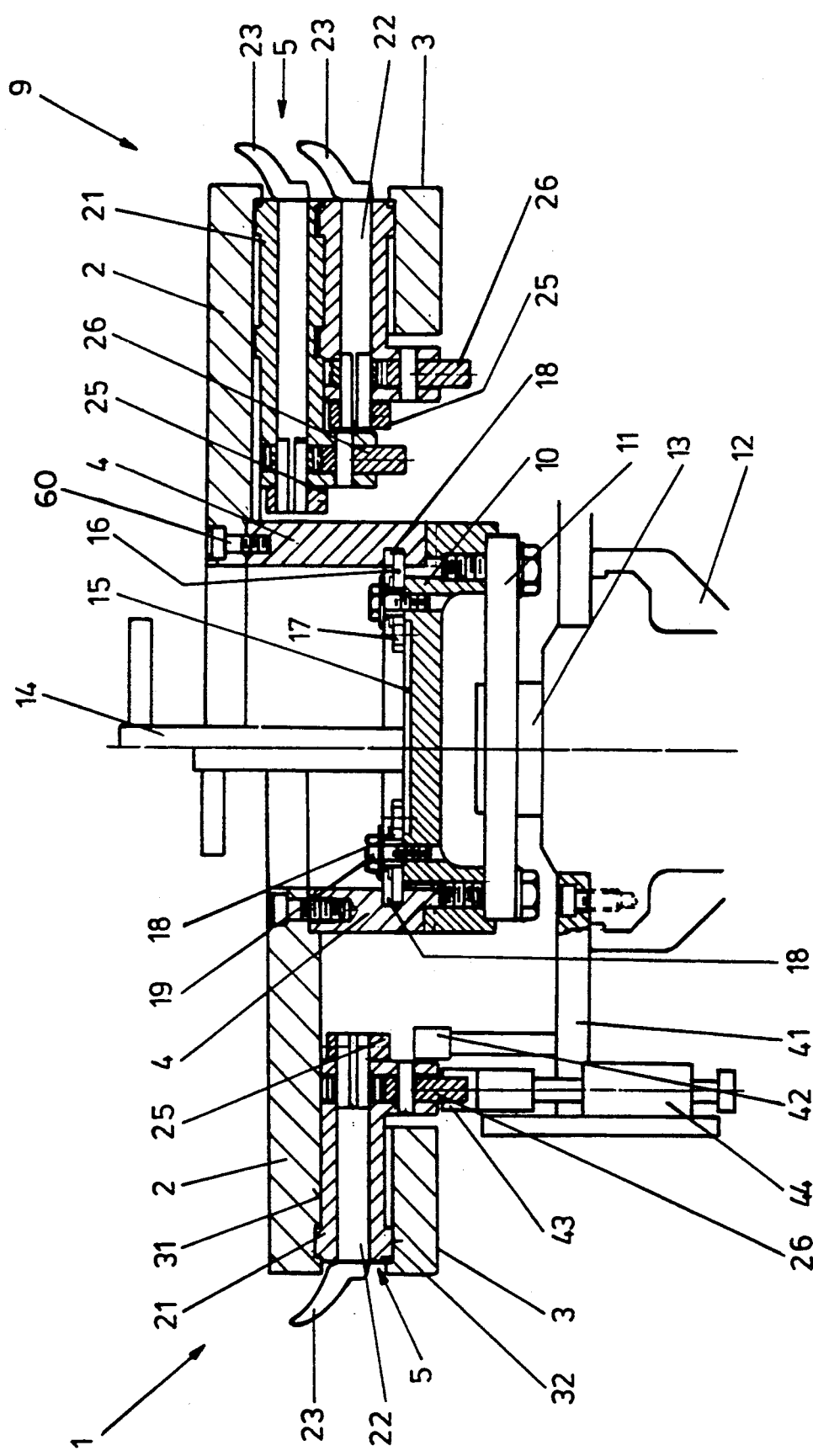
FIG. 2 is a transverse section showing, on the left, a first exemplified embodiment of the sorting star according to the invention, and on the right a second exemplified embodiment with a turn-bolt mechanism according to a first exemplified embodiment.
Figure 3A:
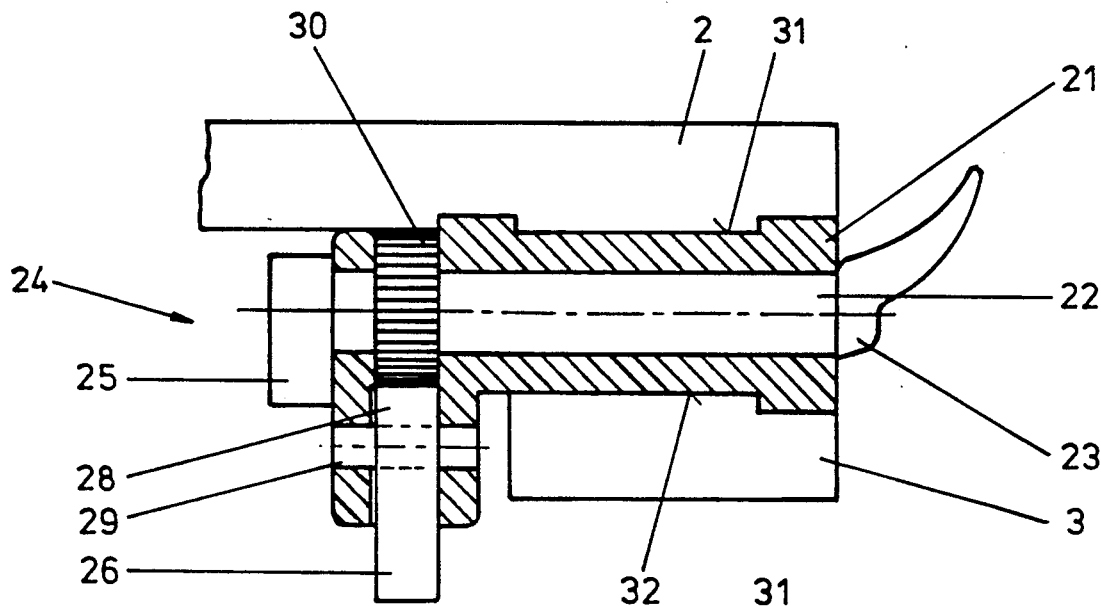
FIG. 3a is a cutaway of the outer periphery of the first exemplified embodiment of the sorting star according to the invention as shown in FIG. 2, with the turn-bolt in the non-operational setting.
Figure 3B:
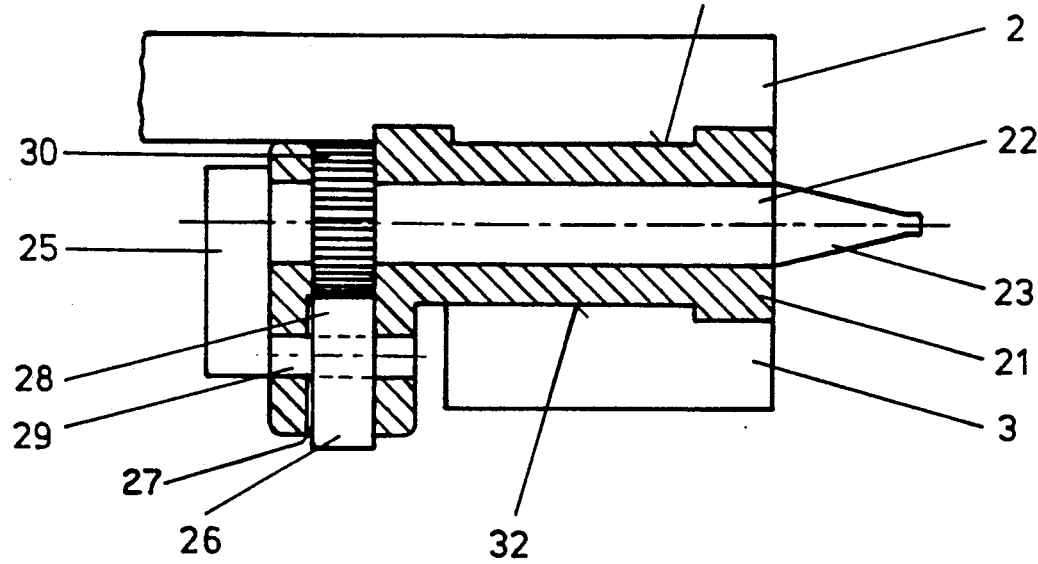
FIG. 3b is a representation corresponding to FIG. 3a, with the turn-bolt mechanism in the operational setting, FIGS. 4a and 4b each represents a front view of the turn-bolt shown in 3a and 3b, in a radial outward view from the inside of the sorting star.
Figure 5A:
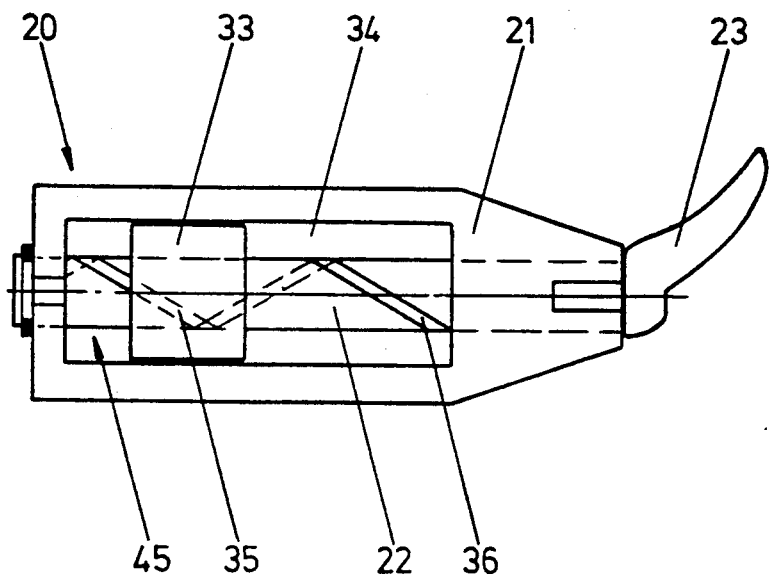
FIGS. 5a and 5b represent a second embodiment of the turn-bolt mechanism according to the invention in top view, and respectively in longitudinal section.
Figure 5B:
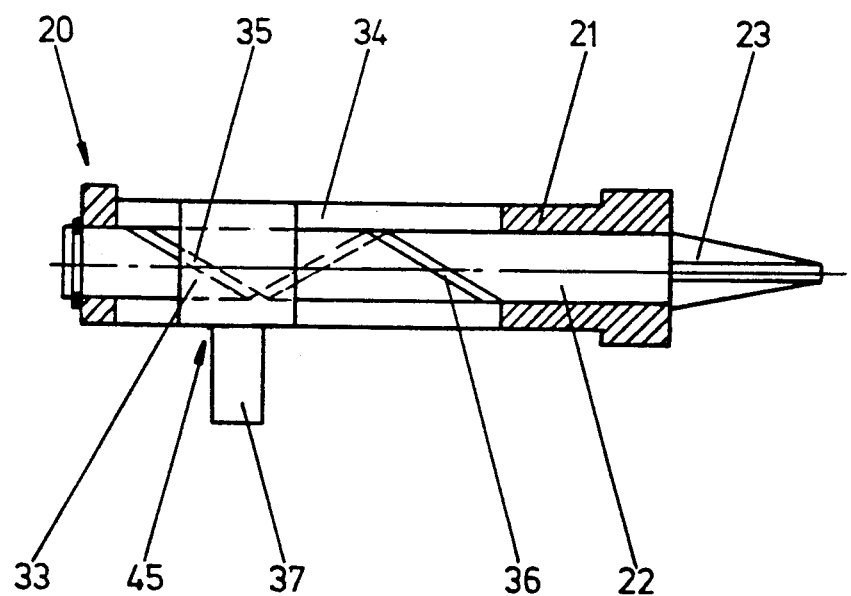

The sorting star 1 of a first embodiment according to the invention, shown on the left in FIG. 2, includes a ring-shaped upper star plate 2, a ring-shaped lower star plate 3, both having the same outer diameter, a sleeve 4 and a number of turn-bolt mechanisms 5. Since the central opening of the lower star plate 3 features a considerably larger diameter than the central opening of the upper star plate 2, in the following text the former is referred to as a star ring. Approximately semi-circular shaped recesses or pockets 6 are uniformly distributed on the outer periphery of the star plate 2 and the star ring 3, intended for receiving containers 7. The radius of the pocket 6 corresponds to that of the container 7 (see FIG. 1).

The turn-bolt mechanisms 5 are arranged between the star plate 2 and the star ring 3, in zones 8 between the adjacent pockets 6, connecting and centering these with respect to each other.

The sorting star 9 shown on the right in FIG. 2 is in principle constructed in the same manner as the sorting star 1 and is intended for sorting containers that are somewhat taller than average and, for this purpose, featuring turn-bolt mechanisms 5 which are arranged at two levels directly over each other between the star plate 2 and the star ring 3. In this arrangement, the respective upper turn-bolt mechanism is longer than the respective lower turn-bolt mechanism.

The sleeve 4, which has an inner diameter equal to the diameter of the central opening of the star plate 2, is centrally fastened to the latter by means of screws 60, and its oppositely lying lower end rests on the free, stepped end of a driver hub 10. The latter is connected, by means of flange 11, to the drive shaft 13 which projects from a drive shaft housing 12.

A rapid-acting clamping device serves to fasten the sorting star 1, 9 to the driver hub 10. Said clamping device includes a rotating turntable 15 that can be rotated by means of a handle 14 and is centrally supported on the driver hub 10. Four quick-lock bolts 16 are provided in the form of a crank assembly with their inner ends swivelably supported through bolts 17 on the turntable 15, and which are provided in order to lock in grooves 18 on the inside of the sleeve 4 in response to rotation of turntable 15. Oblong holes in the quick-lock bolts 16 are penetrated by guide bolts 19 which are screwed into the driver hub 10 and assume control of the quick-lock bolts 16 during their swiveling movement.

Figure 6B:
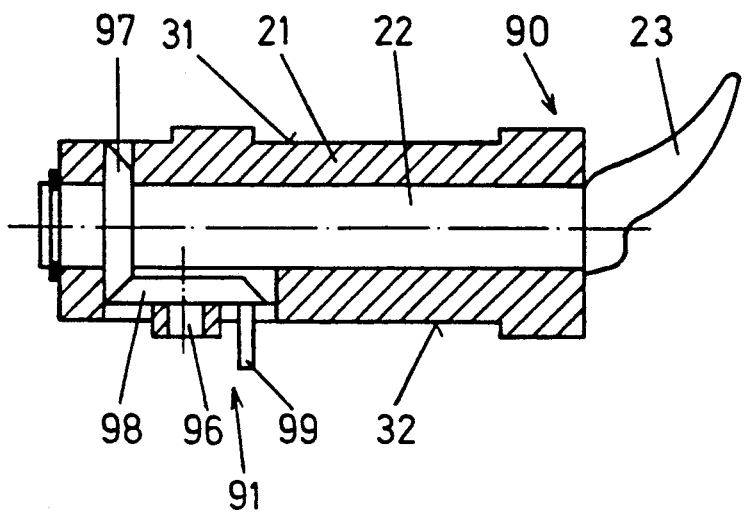
FIGS. 6a and 6b represent a third embodiment of the turn-bolt mechanism according to the invention in top view, and respectively in longitudinal section.
Figure 6A:
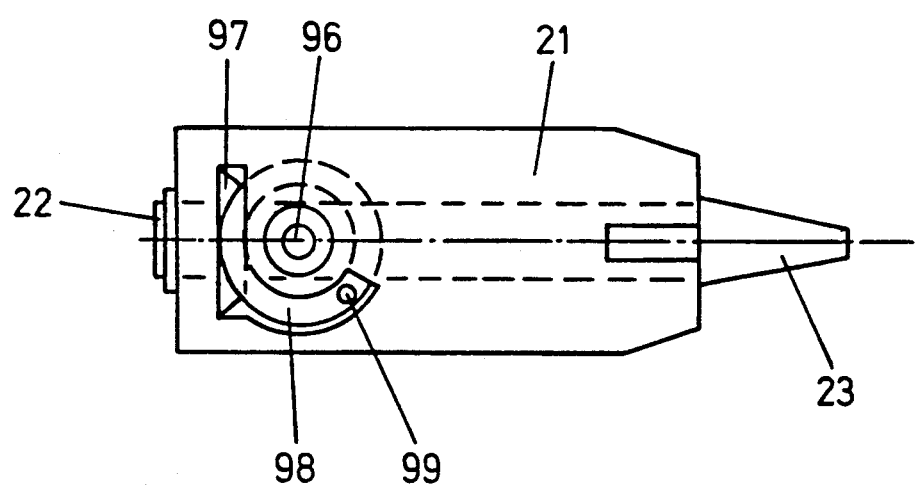

The turn-bolt mechanism 5 according to the first embodiment shown in FIG. 2, and the turn-bolt mechanisms 20 represented in FIGS. 5a, 5b and 6a, 6b and 90 in FIG. 6a, according to second and third embodiments each include an elongated housing 21 with a bearing bore that passes through it, a shaft 22, a turn-bolt 23 comprising a curved blocking arm at one end, and a switching arrangement. The shaft 22 is supported in the bearing bore such that it can rotate 90° between two end limits. The turn-bolt 23 is fastened, in order to rotate with it, to the outer shaft 22 end that projects from the bearing bore and extends over the two star plates 2, 3.

The switching arrangement 24 that is used in the turn-bolt mechanism 5 includes a first switching arm 25 and a second switching arm 26. The first switching arm 25 is fastened in a rigidly fixed manner to the inner shaft 22 end that projects from the bearing bore. The second switching arm 26 is arranged in an opening 27 in a bearing bolt 29 that is parallel to the shaft 22, whereby the opening passes through the housing 21 perpendicular to the bearing bore and opens into it. The second switching arm 26 is provided with a gear segment 28 on its end that faces the bearing bore. The second switching arm 26 is rotatably supported by means of the bearing bolt 29 parallel to the bearing bore, in two corresponding bores in the housing. The gear segment 28 meshes with a gear segment 30, the teeth of which are formed on the circumference of the shaft 22, near its inner shaft end.

The turn-bolt 23 and the first switching arm 25 are fastened to the shaft 22 in such a way that the turn-bolt 23 extends essentially parallel to an upper housing surface 31 and a lower housing surface 32, while at the same time the first switching arm 25 is positioned vertically when the shaft 22 is located in one of the limit settings. Since the upper and lower housing surfaces 31 and 32 of the housing 21 rest against the upper star plate 2, respectively the lower star ring 3, the turn-bolts 23, in the end settings as described, also known as the operational setting, cross the receiving openings defined by the pockets 6 in the star plate 2 and the star ring 3, and in this way prevent the exiting of containers 7 from these receiving openings. The receiving opening is freed when the first switching arm 25, and thus the turn-bolt, are positioned in the opposite end setting, also referred to as the non-operational setting, after a rotation of 90°. The second switching arm 26 is displaced by 90° in both end settings with respect to the first switching arm 25.

In the non-operational setting, the turn-bolt 23 extends vertically toward the upper housing surface 31 and the second switching arm 26 extends vertically toward the lower housing surface 32, while the first switching arm is arranged essentially parallel to the star plates 2, 3, that is, horizontal.

In the operational setting, swiveled by 90°, the turn-bolt 23 and the second switching arm 26 are directed essentially parallel to the star plates 2 and 3, that is, horizontal, while the first switching arm 25 is directed essentially vertically downward in the direction of the lower housing surface.

Of course, deviating from the previous description, a diametrically opposite position of both switching arms 25 and 26, that is, exchanged by 90°, is conceivable.

The arrangement of the switching arms 25 and 26 in both end settings results from the mutual functioning of both meshing gear segments 28 and 29, which represent a gear arrangement for the reversal of the rotational direction. In other words, when the shaft 22 is rotated, both switching arms 25, 26 swivel in opposite directions, whereby at about the half-way point, between the two end settings, they extend essentially parallel to each other.

The switching arrangement 45 (see FIGS. 5a and 5b) used in the turn-bolt mechanism 20 consists of a sleeve 33, which is guided through the housing in a rigidly fixed manner and is arranged so as to slide on the shaft 22. In order to receive the sleeve 33, the housing 21 has an expanded area 34 on the bearing bore, forming a slide guide. The sleeve 33 features a large-pitch inner thread 35 which engages with an cuter thread 36 on the shaft 22. The sleeve 33 has a lug 37 that projects from the housing 21 through the expansion 34 in a downward direction. By moving the lug 37 and thereby the sleeve 33, e.g. by means of curved parts that are subject to control, the shaft 22, and with it the turn-bolt 23, is rotated back and forth between the operational setting, and the non-operational setting.

According to the embodiment represented in FIGS. 6a and 6b, a switching arrangement 91 can be used in the turn-bolt mechanism 90, said switching arrangement consisting of two beveled gears 97 and 98 arranged perpendicular to each other and meshing with each other, whereby the first beveled gear 97 is fastened to the inner end of the shaft 22, while the second beveled gear 98 is supported so as to rotate on a bearing bolt 96 underneath the shaft 22 in a recess in the housing 21. A lug 99 that projects downward from the housing 21 is integrated with the second beveled gear 98, said lug effecting the swiveling of the turn-bolt 23 from one end setting to the other with the help of a non-illustrated, controllable actuation device, e.g. a movable curved part.

The sorting star 1 and 9 according to the invention can be emplaced in all container handling machinery with a filling installation for sorting or distributing containers in order to, for example, sort out dirty or damaged bottles following an inspection machine, or also for sorting incorrectly filled or non-sealed bottles following a filling machine, or improperly labeled containers following a labelling machine. The sorting star 1, 9 according to the invention can be used with the mentioned container handling machinery as a discharge star, or also as an inlet star for sorting out extraneous containers. Furthermore, it is possible to emplace it between a labelling machine and a packaging machine, in order to distribute the containers coming from a one-path labelling machine into a number of paths. In this case, a number of sorting stars 1, 9 according to the invention can be arranged in succession.

In the embodiment according to FIG. 1, three conveyor belts 38, 39, 40 are associated with the sorting star 1, 9 according to the invention, said conveyor belts all extending parallel to the outer periphery of the sorting star. The conveyor belt 38 is a feed conveyor, by means of which the containers 7 are supplied to the sorting star 1,9. The conveyor belt 39 that is connected to the supply conveyor belt 38 having the same feed direction is a sorting conveyor belt intended for sorting e.g. defective containers 7. The remaining containers 7 are transported away in the opposite direction with respect to the previously mentioned conveyors 38, 39.

The actuation device for the sorting star 1 in FIG. 1 consists of two cams 42, 43, which are respectively mounted on a supporting arm 41 that is fastened to the drive shaft housing 12 and located under the sorting star 1. A controllable cam 43 is arranged at the transfer point from the feed conveyor 38 to the sorting star 1 and is provided for the selective switch-over of the turn-bolt mechanism 5 from the non-operational to the operational setting by acting upon the second switching arm 26 of the switching arrangement 24. The second cam 42 is positioned in the transition zone between the sorting star 1 and the discharge conveyor 40 to swivel the turn-bolt 23 back, in order make the exit of the containers 7 from the pockets 6 possible. This cam 42 can be rigidly fastened, that is, it does not need to be subject to control. The cam 42 acts on the switching arm 25, whereby all turn-bolts 23 are brought from the operational to the non-operational setting. The cam 43 located in the area of the sorting conveyor belt 39 and the feed conveyor 38 has a piston/cylinder unit 44 associated with it, and this in turn has a sensor for determining the bottles which are to be sorted out.

The arrangement as described is also conceptually valid for the sorting star 9, except for the fact that in this case the controllable cam 43 as well as the stationary cam 42 are respectively provided in duplicate. For the purpose of an improved overview, these four cams are not drawn in FIG. 2. The function of the sorting star 1, 9 according to the invention is as follows:

To install the sorting star 1, 9 according to the invention, it, along with its sleeve 4 is set onto the step of the driver hub in such a way that non-illustrated radial projections on the latter engage in non-illustrated notches in the sleeve 4. The form-locking that is required to transfer the drive moment and the specific angular arrangement between the sorting star 1, 9 and the driver 10 are thus achieved, such that the quick-lock bolts 16 that are displaced radially outward engage with the grooves 18 of the sleeve 4. In this way the sorting star 1, 9 establishes itself in the axial direction. The step of the driver hub 10 which receives the sleeve 4 serves to radially fix and center the sorting star 1, 9.

The cam 42 that is rigidly fastened in the transfer zone between the sorting star 1, 9 and the discharge conveyor causes all of the turn-bolts 23 there to be opened and to maintain this position up to the transfer zone between the feed conveyor 38 and the sorting star 1, 9. There, the turn-bolts 23 can enter in between the containers that arrive with the appropriate spacing without colliding, so that the container 7 can pass into the associated pockets 6 unhindered. At this moment, the turn-bolts can be brought to the operational setting from the non-operational setting by means of cam 43 and the second switching arm 26. In this manner the containers 7 are kept in the pockets 6 up to the point of transfer to the discharge conveyor 40. If the stationary sensors in the area of the sorting star 1, 9 or the machines that are arranged up-line signal that a damaged container is to be sorted out, then the sensor signal can cause the piston/cylinder unit 44 to be pulled back, so that the second switching arm 26 of the corresponding turn-bolt 23 is not brought into the operational setting. This results in the rejected container entering into a pocket 6 of the sorting star 1, 9 and again immediately leaving it in the direction of the conveyor belt 39. Immediately following this, the cm 43 can again be brought back into the active path of the switching arm, in order to lead containers that are in good condition into the discharge conveyor 40. There, all turn-bolts 23 are again opened in the already described manner by means of the fixed cam 42.

In FIG. 2, both cams 42 and 43 are shown illustrated next to each with the sorting star 1 for reasons of simplification. According to the previous description it is understood that the two cams 42 and 43 are not immediately next to each other, but instead can be mounted so as to be displaced in relation to each other, depending on the desired change-over point, under the sorting star on the circulating path.

I claim:

1. Sorting star for container handling machinery with a rotating star plate and a plurality of turn-bolts arranged so as to rotate with respect to the outer periphery of said star plate, with each turn-bolt having a housing that is attached to the star plate, said housing being provided with a bearing bore directed toward the periphery of the star plate, a shaft rotatable 90° in the bearing bore between two end positions, a turn-bolt rigidly fixed to the outer shaft end that projects from the housing and the outer periphery of the star plate, an actuation device positioned at a place adjacent the star plate where the turn-bolt is actuated, and a switching arrangement that contacts the shaft and is forcibly actuated by said actuation device to turn the shaft between the two end positions, characterized by the fact that the switching arrangement (24, 45) is actuated only from one side of the sorting star (1,9).

2. Sorting star according to claim 1, characterized by the fact that the switching arrangement (24, 45, 91) is actuated from below the sorting star (1,9).

3. Sorting star according to any one of claims 1 or 2, characterized by the switching arrangement (24) including two switching arms that are alternately actuated and swiveled through an angle of 90°, and switching arms (25, 26) are engaged with each other by means of a gear arrangement (28, 30) that reverses the direction of rotation.

4. Sorting star according to claim 3, characterized by the fact that the first (25) of the two switching arms (25, 26) is rigidly fixed to the shaft (22) and the second switching arm (26) is supported in the housing (21) parallel to the shaft (22).

5. Sorting star according to any one of claims 1 or 2, characterized by the fact that the switching arrangement (45) includes a sleeve (33) that is guided through the housing (21) in a rigidly fixed manner and slides along the shaft (22), said sleeve having inner threads (35) with a large pitch and outer threads (36) on the shaft (22) that engage with said inner threads.

6. Sorting star according to claim 5, characterized by the fact that the sleeve (33) is moved by means of a lug (37) that projects from the housing (21) and is actuated by the actuation device.

7. Sorting star according to any one of claims 1 or 2, characterized by the fact that the switching arrangement (91) includes a first bevel gear (97) that is rigidly fixed to the inner shaft end, and a second bevel gear (98) that meshes with said first bevel gear.

8. Sorting star according to claim 7, including an integrated lug (99) characterized by the fact that the second bevel gear (98) is actuated by said integrated lug (99) projecting downward from the housing (21) through said actuation device.

9. Apparatus for sorting preselected containers from a series of containers, comprising:
 a generally circular star wheel disposed in a substantially horizontal plane for being driven rotationally about a substantially vertical axis, said wheel having a top side and a bottom side and a plurality of pockets arranged around the periphery thereof with a separation space between pockets,
 means for feeding containers into successive pockets at an infeed station,
 a blocking mechanism mounted to said bottom side of said star wheel at each space between pockets and having a blocking arm operative to a position in which said arm interferes with discharge of a container from an adjacent pocket or to an alternate non-interfering position for allowing discharge of said container from the pocket,
 a blocking mechanism operator means positioned entirely blow said bottom side of said star wheel at a selection station to which said containers are rotationally advanced by said star wheel from said infeed station, said operator means alternatively actuating said blocking arm to interfere with discharge of a container from the pocket at the selection station or to not interfere to allow discharge of the container from the pocket depending on whether the container is or is not a preselected container.

10. The apparatus for sorting containers according to claim 9 wherein said blocking mechanism comprises:
 support means mounted to said bottom side of said star wheel and a first shaft whose axis extends radially of the wheel is journaled for rotation in said support means, said shaft having an outer end and an inner end which is less radially remote from the center of said star wheel than said outer end and said blocking arm extends radially from said outer end,
 a toothed gear element mounted concentrically to said shaft at its inner end and a first switching arm extending radially from said inner end, a second shaft supported in said support means spaced from and in parallelism with said first shaft, and a second switching arm extending generally radially from the second shaft together with a gear element having teeth concentric to the second shaft and meshed with the teeth of said gear element of said first shaft, said operator actuating said second switching arm for driving said blocking arm rotationally into interfering position when the container at the selection station is not a preselected container.

11. The apparatus for sorting containers according to claim 10 wherein said gear element on said second shaft and said second switching arm are formed in one place with the second arm extending radially from the gear element.

12. The apparatus for sorting containers according to claim 10 including a cam member fixed under said bottom side of the star wheel and positioned so as to be engageable with any of said first switching arms, which have turned rotationally as a result of said second arm having been actuated, to be actuated by said cam member for driving said blocking arms into non-interfering position to allow discharge of the containers from respective pockets.

13. The apparatus for sorting according to claim 10 wherein said operator means includes a work cylinder which is responsive to arrival of containers which are not preselected at said selection station by actuating said second switching arm for effecting rotation of said blocking arm into interfering position.

14. The apparatus according to claim 10 wherein said gear element on said first shaft is formed integrally with said first shaft.

15. The apparatus for sorting containers according to claim 9 wherein said blocking mechanism comprises:

support means mounted to said bottom side of said star wheel and a shaft extending through said support means and journaled for rotation therein, the axis of said shaft extending radially away from the center of the star wheel and said blocking arm is fastened to said shaft for said blocking arm to be rotated into and out of a position in which the blocking arm, respectively, interferes and does not interfere with discharge of containers from the pockets, said support means having an elongated opening extending along said shaft and said shaft having an axially extending external thread, a sleeve fitted on said shaft and having a bore containing an internal thread having a large pitch for running in axially opposite directions on the external thread on the shaft, said operator means being operative to move said sleeve in one direction for rotating said shaft for driving said blocking arm in interfering position and in the other direction for driving said blocking arm into non-interfering position.

16. The apparatus according to claim 15 wherein said sleeve has a lug projecting therefrom and said operator means engages said lug for driving said sleeve axially of the shaft.

17. The apparatus according to claim 9 wherein said blocking mechanism comprises:

support means mounted to said bottom side of said star wheel and a shaft extending through said support means and journaled for rotation therein, the axis of said shaft extending radially away from the center of the star wheel and said blocking arm is fastened to said shaft whereby said blocking arm is respectively rotated into and out of a position in which the blocking arm interferes and does not interfere with discharge of containers from the pockets, a first beveled gear fixedly mounted concentrically to said shaft for rotating with the shaft about the axis of the shaft, a second beveled gear meshed with the first beveled gear and rotatable about an axis which is at right angles to the axis of the first beveled gear and the shaft, and means for coupling said operator means to said second beveled gear to rotate said second beveled gear in opposite directions to turn said blocking arm into and out of interfering position.

18. The apparatus according to claim 17 wherein said means for coupling said operator means includes a lug which projects downward and away from the bottom side of said star wheel.

* * * * *

UNITED STATES PATENT AND TRADEMARK OFFICE
CERTIFICATE OF CORRECTION

PATENT NO. : 5,096,042
DATED : March 17, 1992
INVENTOR(S) : Josef Loll

It is certified that error appears in the above-indentified patent and that said Letters Patent is hereby corrected as shown below:

On the Title page, in the title delete the word "specification "from the title so that it reads "Sorting Star for Container Handling Machinery".
Column 8, line 46, delete "blow" and substitute -- below --.
Column 9, line 14, delete "place" and substitutue -- piece --.

Signed and Sealed this

Fifteenth Day of June, 1993

Attest:

MICHAEL K. KIRK

Attesting Officer

Acting Commissioner of Patents and Trademarks